United States Patent [19]

Ewer et al.

[11] 4,416,103

[45] Nov. 22, 1983

[54] APPARATUS FOR LOADING SLICED AND BULK FOOD PRODUCTS

[76] Inventors: Gerald Ewer, 2818 Calaveras Dr., Fairfield, Calif. 94533; Arnold Agre, 8762 Gray Fox Dr., Evergreen, Colo. 80439

[21] Appl. No.: 232,135

[22] Filed: Feb. 6, 1981

[51] Int. Cl.[3] ........................ B65B 25/06; B65B 35/40; B65B 57/14; B65G 25/08

[52] U.S. Cl. ........................................ 53/517; 53/247; 53/248; 53/499; 53/537; 53/539; 198/429

[58] Field of Search ................. 53/157, 247, 248, 498, 53/499, 539, 517, 543, 537, 496; 198/427, 429, 430; 83/97, 164, 437, 569

[56] References Cited

U.S. PATENT DOCUMENTS

| | | | |
|---|---|---|---|
| 941,001 | 11/1909 | Wise | 83/437 |
| 2,572,770 | 10/1951 | Shadduck | 83/437 |
| 2,684,799 | 7/1954 | Holstein | 198/429 X |
| 2,690,802 | 10/1954 | Russell | 83/97 X |
| 2,821,822 | 2/1958 | Mapes | 53/247 X |
| 2,852,053 | 9/1958 | Berry et al. | 83/437 |
| 2,957,287 | 10/1960 | Cella | 53/539 X |
| 3,149,713 | 9/1964 | Bontempi | 198/429 |
| 3,180,066 | 4/1965 | Mahaffy et al. | 53/247 X |
| 3,180,195 | 4/1965 | Clark | 83/437 X |
| 3,238,698 | 3/1966 | Hollenton | 53/262 X |
| 3,360,097 | 12/1967 | Huffman et al. | 198/429 |
| 3,431,702 | 3/1969 | Spaulding | 53/539 X |
| 3,638,391 | 2/1972 | Fluck | 53/475 |
| 3,678,649 | 7/1972 | Clancy | 53/529 |
| 3,737,051 | 6/1973 | Horino | 414/28 |
| 3,812,647 | 5/1974 | Bertling et al. | 53/500 |
| 3,893,282 | 7/1975 | Armbruster et al. | 53/252 |
| 3,998,339 | 12/1976 | Booth | 414/46 |
| 4,003,185 | 1/1977 | Goff | 53/539 X |
| 4,048,784 | 9/1977 | Toby | 53/77 |
| 4,108,031 | 8/1978 | Dangelmaier et al. | 83/90 |
| 4,111,086 | 9/1978 | Dangelmaier | 83/90 |
| 4,111,087 | 9/1978 | Pankratz et al. | 198/781 X |

*Primary Examiner*—Nicholas P. Godici
*Assistant Examiner*—Charles L. Willis
*Attorney, Agent, or Firm*—Manfred M. Warren; Robert B. Chickering; Glen R. Grunewald

[57] ABSTRACT

Apparatus is disclosed for simultaneously transferring a plurality of stacks of sliced or bulk food product from a holding station, such as the output of a slicing and stacking machine, to a receiving station, or the like, for loading and packaging of the food product. The device includes a rapidly and continuously operating accumulating conveyor for transferring a plurality of stacks from the holding station to a transfer station, and a shuttle-like, product-engaging member mounted proximate the transfer station for rapid, reciprocating movement transverse to the conveyor for transferring the plurality of stacks from the transfer station to a loading station. The product-engaging member has a plurality of concave portions, each formed to receive one stack of the plurality of stacks of product. A stop is positioned at the transfer station for releasably detaining a first stack in approximate alignment with a first of the concave portions, and switchs are disposed at the transfer station to sense the presence of a plurality of stacks and to actuate the transverse movement of the product-engaging member. At the loading station a combination of support tines or fingers and knife edges hold the food product level over openings for loading of the product into packages at the receiving station. Upon retraction of the fingers, plungers force the stacks of food product past the knife blades and into packages at the receiving station.

2 Claims, 4 Drawing Figures

APPARATUS FOR LOADING SLICED AND BULK FOOD PRODUCTS

BACKGROUND OF THE INVENTION

1. Field of the Invention

The invention relates to apparatus for the automatic handling of comestible products and in particular to apparatus for the rapid transport of stacks of comestibles in loading and packaging operations or the like.

2. Description of the Prior Art

In the commercial preparation of prepackaged, food products, such as luncheon meats and cheeses, machines are commonly employed for rapidly and automatically slicing, stacking, and weighing the food products. Machines are also available for automatically sealing and labeling packages containing the stacks of food products. At present, however, the stacks of food products are commonly loaded by hand into individual packages. The loading of the stacks by hand is not only slow, but also increases the possibility of contaminaton.

The automatic loading of food products into packages or the like is further complicated when stacks of presliced product are to be loaded. The stacks are often fragile and delicate and can be easily deformed or mutilated by rough handling during loading operations, which can result in an unsightly or improperly sealed, hence unacceptable, package. Because of the fragile nature of the stacks of sliced product, rigorous demands are made on precise positioning and aligning of the stacks for loading into the packages.

Furthermore, a typical packaging apparatus for presliced food products will include a plurality of side-by-side lines with stacks of product being packaged in side-by-side cavities or spaces. It is faster to load the several stacks into adjacent cavities or loading spaces for packaging, but simultaneous loading presents the additional problem of pre-arranging the stacks to fit the cavity or loading zones conveying the stacks to the cavities without disrupting the pre-arrangement, and performing the operation quickly, lest the advantage of simultaneous loading over sequential loading be lost.

A common obstacle to increased speed of operation is the increasing tendency of stacks of luncheon meat and the like to pokerchip, i.e., to become lopsided or skewed in the manner of a stack of pokerchips, when undergoing more and more rapid accelerations and decelerations as the speed of operation is increased. Pokerchipping results in the delicate stacks becoming mutilated or edges being torn from individual slices as the food is handled further by the apparatus, hence, it cannot be tolerated. Although present in any food-stack handling operation, the problem of pokerchipping is particularly acute in the typical loading operation, in which the stacks undergo many rapid movements as they are separated, sorted, aligned, transported, and finally inserted into packages.

Prior attempts to solve these problems, for example, U.S. Pat. Nos. 3,893,282 and 4,048,784, have met with only limited success and acceptance.

SUMMARY OF THE INVENTION

Accordingly, it is an object of the present invention to provide a device for transporting simultaneously a plurality of stacks of food products for loading and packaging or the like. The apparatus of the present invention is capable of operating at a very high repetition rate, heretofore unachievable for soft deformable food products, while maintaining the integrity of stacks of sliced products. It is a further object of the present invention to provide for rapid handling of stacks of sliced food products with no resulting injury to the stacks.

The apparatus of the present invention is used to transfer stacks of food products from a holding station, which holds the stacks to be transferred, to a loading station or the like for loading and packaging. In its broadest aspect the present invention includes first transfer means, which is provided by a rapidly and continuously operating accumulating conveyor, which is the type upon which stacks may readily be detained or accumulated without halting the operation of the conveyor. The first transfer means transfers stacks from the holding station to a transfer station. Second transfer means, provided by a product-engaging member mounted proximate the transfer station for rapid, reciprocating movement transverse to the conveyor, transfers the stacks from the transfer station to the loading station. The product-engaging member has a plurality of concave portions, each of which is formed to receive one stack of a plurality of stacks at the transfer station. Stop means is provided for releasably detaining a first stack of the plurality of stacks at the transfer station on the conveyor in approximate alignment with one of the concave portions, the stop means having a height sufficient to maintain the integrity of the first stack as it is detained. Switch means is disposed at the transfer station and is formed to sense the presence of the plurality of stacks when the first stack is detained by the stop means and when the remainder of the plurality is positioned in a predetermined location on the conveyor behind the first stack. The switch means is connected to actuate transverse movement of the product-engaging member to transfer smultaneously the plurality of stacks from the transfer station to the loading station. Means is provided to displace the stop means as the product-engaging member undergoes its transverse movement. As the stop means is displaced, the first stack of the plurality is freed to move along the conveyor, and this motion, cooperating with the rapid transverse movement of the product-engaging member, causes registration and engagement of the plurality of the stacks with the plurality of concave portions .

In the normal mode of operation of the present invention a receiving station supplying packages, containers or the like for the stacks of food products is located beneath the loading station, which is formed with a plurality of openings to permit passage of the stacks from the loading station to the receiving station. In another of its aspects the present invention includes means for maintaining a stack at the loading station in a level disposition and in registration with the receiving station, the means being adapted to release the stack for level movement from the loading station to the receiving station.

The invention described and claimed herein may be better understood with reference to the accompanying drawings, which depict a preferred embodiment of the invention and which are intended merely to illustrate rather than limit the invention in scope.

DETAILED DESCRIPTION OF THE INVENTION

Figure 1:
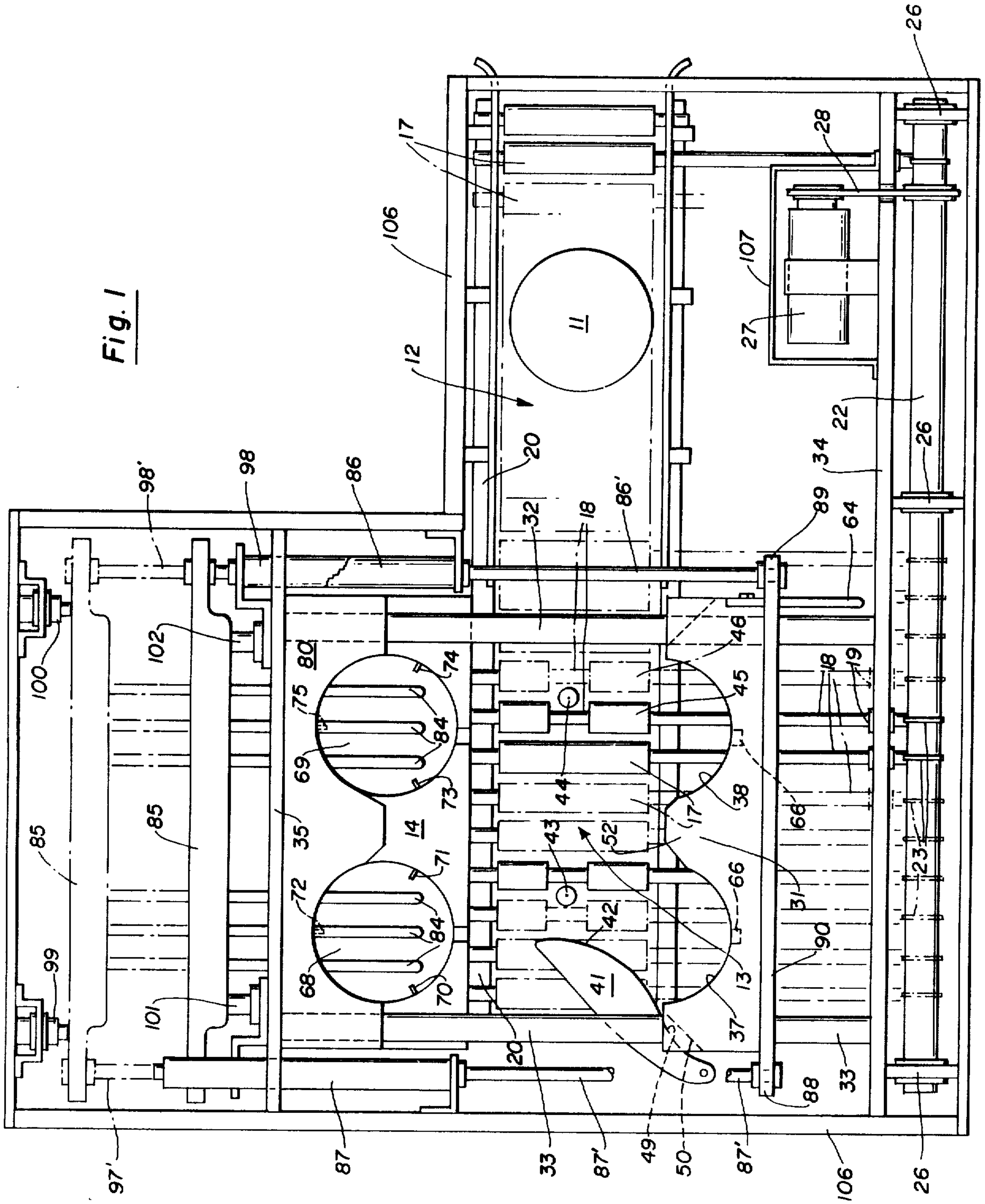
FIG. 1 is a top view of apparatus constructed in accordance with the present invention with the plungers at the loading station omitted for greater visibility.

The present invention is a device for rapidly and simultaneously transferring a plurality of stacks of food products from a holding station, at which the stacks can accumulate, to a loading station or the like for packaging of the food products or for loading into other apparatus for further processing. In FIG. 1 a food stack 11 is shown situated at a holding station, designated generally by 12. As is common in prior art transporting and loading apparatus, the apparatus disclosed herein includes a first transfer means for transporting a plurality of stacks of food products from holding station 12 to a transfer station generally designated 13 and a second transfer means to transfer the plurality of stacks from transfer station 13 to a loading station generally designated 14.

In the present invention the first transfer means is provided by a rapidly and continuously operating conveyor which is formed to allow stacks of food products to be accumulated or detained thereon without mutiliation of the bottom slice of a stack due to frictional rubbing or the like. Conveyors of this type are known in the industry as accumulating conveyors and are characterized by the fact that the displacement of a stack along the conveyor line can be retarded or halted by the application of an impeding force to the stack without interruption of the operation of the conveyor itself. In the embodiment of the figures the conveyor is provided by an array of parallel rollers 17 rotatably mounted to roller shafts 18 which are in turn rotatably supported by bearing blocks 19 and 20. Power supplied to roller shafts 18 causes the rollers 17 to rotate thereby advancing any stacks of food products situated thereon. The rotational mounting between rollers 17 and roller shafts 18 is such that a small impeding force applied to a stack situated upon the rollers will cause the stack and the rollers thereunder to come to rest while the roller shafts 18 continue to rotate, thus providing the necessary accumulating feature. In the embodiment of the figures power is supplied to the drive shafts 18 through main shaft 22, which is coupled by belt means 23 to belt pulleys 24 fixed to the ends of the drive shafts 18. Main shaft 22 can be supported by bearings 26 in a manner well known in the art and driven by motor 27, which is coupled thereto by main belt means 28. A conveyor of the type suitable for use in the apparatus of the present invention is manufactured by Shuttleworth, Inc. of Huntington, Ind.

Figure 3:
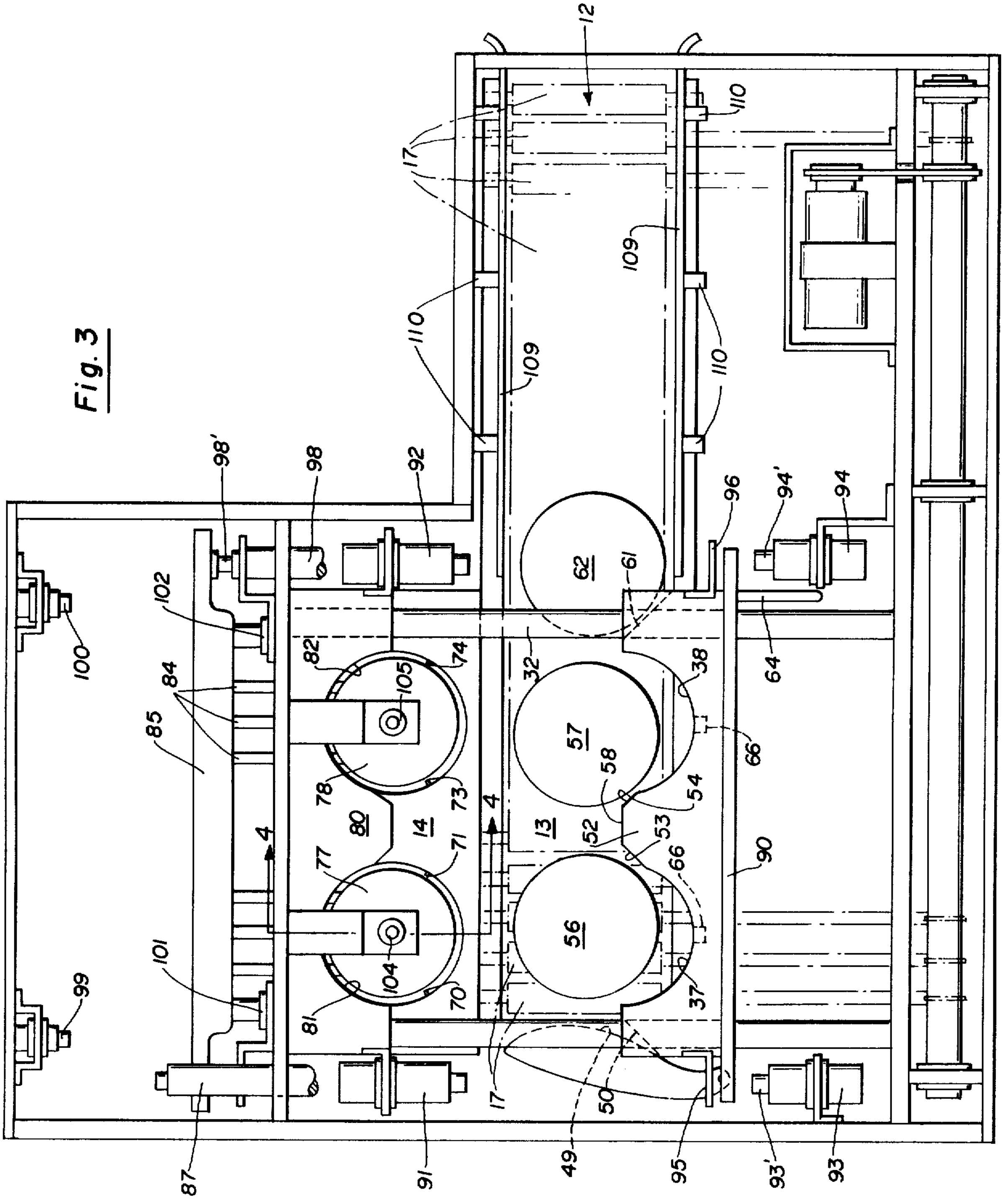
FIG. 3 is a top view of the apparatus of FIG. 1, showing the product-engaging member in a moved intermediate position traversing the transfer station. The plungers and several shock absorbers, omitted from FIG. 1, are shown in FIG. 3.

In the present invention the second transfer means is provided by a shuttle-like, product-engaging member 31, which is mounted proximate transfer station 13 for rapid, reciprocating movement transverse to the conveyor to urge stacks of product toward the loading station. In the embodiment of the figures product-engaging member 31 is mounted on and supported solely by parallel guide shafts 32 and 33. These guide shafts are secured to walls 34 and 35 and pass through the member 31, which is mounted to slide freely thereon. In the apparatus of the present invention the product-engaging member has a plurality of concave portions, each formed to receive one stack of a plurality of stacks at the transfer station. In the embodiment illustrated in the figures product-engaging member 31 is formed with two concave portions 37 and 38, and transfer station 13 is constructed to receive a plurality of two stacks for simultaneous conveyance to loading station 14. Transfer station 13 and product-engaging member 31 can, of course, be made to accommodate a larger number of stacks. The concave portions 37 and 38 illustrated in FIGS. 1 and 3 are semi-cylindrical in shape to accommodate the commonly used cylindrical stacks of sliced meat and cheese products. Other shapes of concave portions can, of course, be used to accommodate differently shaped food product. For example, concaved portions 37 and 38 can be formed to mate with or accommodate square-shaped product, or even bulk product, such as sausage-like meat products called "chubs" in the industry.

As used herein, therefore, the expressions "stack" or "stacks" shall include sliced product and unsliced or bulk product and shall include product having a variety of peripheral configurations. A square block of bulk cheese or a knockwurst chub are stacks of food product.

Positioned at transfer station 13 is a first stop means 41, which is moveable for releasably detaining a first stack of a plurality of stacks at transfer station 13 on the conveyor in approximate alignment with a first of the concave portions. As can be seen from FIG. 1, a first stack moving along the conveyor to transfer station 13 will be detained by the leading edge 42 of first stop means 41. The leading edge 42 is positioned to hold the stack in approximate alignment with, but not in precise registration with the concave portion 37. For reasons discussed herein below it is preferable to detain the first stack slightly upstream on the conveyor from a position of precise registration with concave portion 37. The expression "approximate alignment," as used herein, includes being offset from the position of precise registration.

A stack such as 11 generally travels rapidly down the conveyor line. When brought to a sudden stop on the conveyor, a stack composed of individual slices has a tendency to topple over or "pokerchip," that is, to become misaligned like a stack of pokerchips. To prevent this pokerchipping effect, stop means 41 is preferably formed with a height at least as great as the height of the stacks of sliced product on the conveyor. In this manner stop means 41 will apply an impeding force to the first stack uniformly over its entire height dimension, thereby maintaining the integrity of the first stack as it is detained.

If product-engaging member 31 is to transfer simultaneously a plurality of stacks (which may be any predetermined number of stacks) to the loading station 14, the transverse movement of member 31 from transfer station 13 to loading station 14 cannot be initiated until the desired plurality of stacks is present at the transfer station. To control the actuation of the movement of member 31, switch means is disposed at the transfer station. The switch means is formed to sense the presence of the plurality of stacks at the transfer station when the first stack is detained by stop means 41 and the remainder of the plurality is positioned in a predetermined location on the conveyor behind the first stack. In accordance with the present invention that predetermined location puts the remaining stacks in approximate alignment with the concave portions of member 31. The switch means in FIG. 1 is comprised of two whisker switches 43 and 44 positioned at transfer station 13 and extending upward above the top surface of the conveyor so as to be tripped by the stacks as they pass along the conveyor. To provide room for whisker switch 44, the immediately adjacent rollers 45 and 46 are each composed of two separated sections, see FIG. 1, and similarly for the rollers adjacent whisker switch 43. The sensor-switches 43 and 44 are coupled to a control logic system to function as an AND gate. That is, no actuating signal will be sent unless both switches 43 and 44 are simultaneously tripped.

Figure 2:
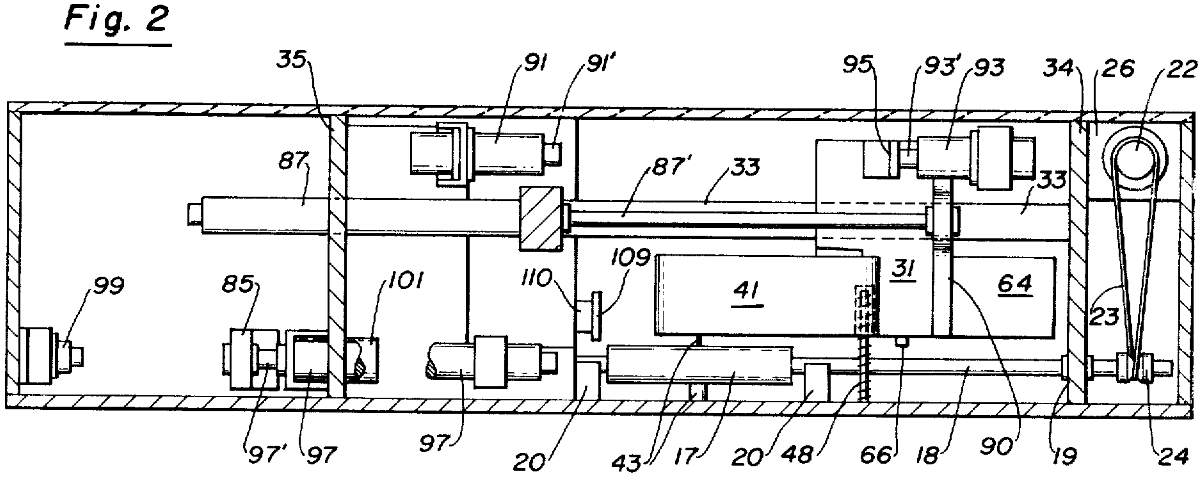
FIG. 2 is a side elevational view, in cross-section, of the left side of the apparatus as shown in FIG. 1 taken immediately beneath the side wall.

When the first stack is in its detained position against leading edge 42 and the remainder of the plurality of stacks is in its predetermined location behind the first stack, the switch means actuates the transverse movement of member 31. The apparatus is provided with means for displacing stop means 41 in cooperation with transverse movement of member 31. Displacement of stop means 41 frees the first stack to move along the transfer station under urging by conveyor rollers 17, which longitudinal movement together with the transverse movement of product-engaging member 31 causes registration and engagement of the first stack with the concave portion 37. In a prederred embodiment stop means 41 is biased toward its stack-detaining position shown in FIG. 1. This is accomplished, for example, by torison spring 48 as shown in FIG. 2. The means for displacing stop means 41 may advantageously be provided by cam surface 49 on stop means 41 and a cam-engaging portion carried by the product-engaging member 31. A suitable cam-engaging portion is provided by the angle surface 50, which is formed to engage cam surface 49 and displace stop means 41 against the biasing force exerted thereon by bias spring 48. This simple arrangement with its minimum of moving parts provides for very precise and reliable cooperation between the detaining action of stop means 41 and the advancement of product-engaging member 31 along its transverse movement. Other, more intricate means can also be employed for coordinating the displacement of stop means 41 with the transverse movement of member 31, such as gear or cam assemblies or logic control sytems.

When product-engaging member 31 commences its transverse motion, it encounters the plurality of stacks at transfer station 13 in approximate alignment with its plurality of concave portions, owing primarily to the disposition of the switch means at transfer station 13 and the coordinated retraction of stop means 41. When the fast-moving, transversely reciprocating, member 31 impinges upon a stack waiting at transfer station 13, the impact can upset or deform the stack. To prevent such mutiliation and to maintain the integrity of the stack, concave portions 37 and 38 are also preferably formed with a height greater than the height of the stacks at the transfer station and are shaped to conform to the stack in registration therewith. Furthermore, member 31 can advantageously be formed with a wedge-like portion 52 between the two adjacent concave portions 37 and 38. The primary purpose of wedge-like portion 52 is to guide two adjacent stacks into registration and engagement with two corresponding adjacent concave portions as member 31 moves forward. To achieve this purpose, wedge-like portion 52 can have a variety of shapes and is not limited to a simple triangular wedge shape. As illustrated in FIG. 3, portion 52 is formed with a downstream sloped surface 53 and an upstream sloped surface 54. When the transverse motion of member 31 is actuated and simultaneously therewith stop means 41 releases the stacks at the transfer station for movement, the lead stack of an adjacent pair, such as stack 56 in FIG. 3, will be carried by the conveyor away from sloped surface 53 while the trailing stack 57 of the pair will be carried toward sloped surface 54. Because of this preferred direction of movement of stacks 56 and 57, portion 52 is advantagously formed to be assymetrical with sloped surface 53 cutting deeper into concave portion 37 than surface 54 cuts into concave portion 38. Furthermore, portion 52 is preferably formed with a blunt forward surface 58 so as not to puncture or otherwise damage a stack as member 31 crosses the transfer station.

Because the conveyor carrying stacks from holding station 12 to transfer station 13 is continuously operating, stacks accumulating at holding station 12 will be continuously fed to the transfer station. Thus, after an appropriate number of stacks had been delivered to transfer station 13 and product-engaging member 31 has been set into motion, the conveyor will continue to carry stacks accumulated at holding station 12 to the transfer station. To prevent an additional stack from entering into the transfer station, guide means is provided to cooperate with the motion of member 31 for backwardly urging a stack from a position at the transfer station behind the last stack of the desired plurality against the motion of the conveyor to holding station 12. In a preferred embodiment the guide means is carried by member 31 itself. In FIG. 3 the guide means is provided by the angled vertical wall 61, which is disposed at the forward edge of member 31 beneath guide shaft 32 so as to contact a prematurely arriving stack such as 62 and urge it back toward holding station 12. As will readily be appreciated by one skilled in the art, the guide means can also be formed of a separate member distinct from member 31, but coupled thereto for coordinated motion.

When product-engaging member 31 has advanced across transfer station 13 on its way to loading station 14, any accumulated backlog at holding station 12 will be carried by the continuously operating conveyor to transfer station 13 behind the member 31. To keep the transfer station clear for the return of member 31 while allowing the conveyor to operate continuously, the apparatus is provided with second stop means for detaining stacks at the holding station during movement of the product-engaging member transverse to the conveyor. For simplicity of operation and manufacture the second stop means can be provided by member 64 carried by and protruding behind product-engaging member 31. The member 64 has sufficient length to block the passage from the holding station to the transfer station when member 31 is positioned at loading station 14, and it has sufficient height to prevent a stack from poker-chipping if it should impinge thereupon. Alternatively, the second stop means can be provided by a member mounted apart from member 31, but coupled thereto for coordinated operation. Second stop means mounted apart from member 31 in this manner can also be formed to provide simultaneously the above-mentioned guide means.

To allow for smooth passage of the member 31 across transfer station 13, member 31 is mounted with a small clearance between its lower surface and the upper surface of the conveyor. It sometimes happens that the individual slices of a stack have a thickness comparable with this clearance, and for this reason member 31 can fail to carry the bottom slice of a stack across the transfer station to the loading station. To insure that the bottom slice is picked up, product-engaging member 31 is provided with protruding members 66 (FIG. 2) extending beneath the lower extremities of the concave portions. Each protrusion is formed and positioned to engage the bottom slice of a stack on the conveyor in registration with a concave portion. Since member 66 must project beneath the conveying surface of the conveyor to pick up the bottom slice, the conveyor is formed with a channel thereacross to receive protruding member 66. In a conveyor composed of individual rollers, as illustrated in the figures, an appropriate channel is provided by the spacing between two adjacent rollers. In other types of accumulating conveyors composed of juxtaposed subunits or modules an appropriate channel can similarly be provided by the spacing of adjacent subunits or modules.

Loading station 14 includes a plurality of openings 68 and 69, which lead to a receiving station located beneath the loading station. The receiving station will generally be associated with separate and distinct apparatus for packaging and the like positioned below the apparatus of the present invention. It may be comprised of a conveyor or other surface upon which side-by-side trays or similar open receptcles or cavities are placed and into which the stacks of product are loaded directly from loading station 14. The receiving station may alterntively be comprised of a stack-receiving portion of separate apparatus for further processing of the food product.

Product-engaging member 31 is mounted to move the plurality of stacks into a position at the loading station 14 in registration over openings 68 and 69. The stacks are thus able to pass through the openings and into the package or recepticle waiting at the receiving station below. It is important that the stacks not be tilted, but kept level, as they pass through the openings to the receiving station; otherwise, the stacks can become misshapen and mutilated as the stacks pass through the openings or as they are received in the packages. This will result in an unsightly or mutilated product or possibly in improperly sealed packages. For this reason, the present apparatus preferably includes means positioned at each of openings 68 and 69 for maintaining the stack at that opening in level disposition and also for releasing the stack for level movement from the loading station to the receiving station.

Figure 4:
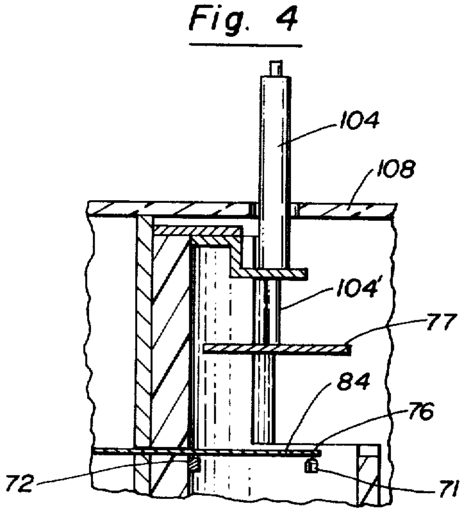
FIG. 4 is a fragmentary, cross-sectional view of the plunger and loading station taken substantially along the plane of the line 4—4 in FIG. 3.

In the embodiment shown in the drawings the means for maintaining the stacks in level disposition is provided by a plurality of knife blades 70–75 mounted in a horizontal plane proximate the periphery of each of the openings 68 and 69 for engagement with the underside of the stacks about their perimeters. The knife blades 70–75 are disposed about the openings 68 and 69 in spaced relation to one another and project from the side walls of these openings a short distance with their sharpened edges, for example edge 76 in FIG. 4, directed upward. The knife blades 70–75 extend into openings 68 and 69 a sufficient distance to support a food stack resting thereon. A stack resting on the knife blades in this manner will be maintained in level disposition because the relatively light weight will not cause the knife blades to cut significantly into the bottom portion or slice of the stack.

To induce the stacks to pass through openings 68 and 69 to the receiving station, plunger means 77 and 78 are mounted for vertical movement above the openings 68 and 69 for urging a stack toward the receiving station. The stack-engaging surface of plunger means 77 and 78 is formed with a boundary shaped to provide clearance with respect to the knife blades. As illustrated in FIG. 3, the plungers can be formed with a smaller diameter than their respective openings to provide the necessary clearance. Alternatively, the plungers can be formed with small cutouts to accommodate the projecting knife blades. The plungers 77 and 78 will then push the stacks past the knife blades, which easily cut through the comestible products. In this way the stacks are released from the knife blades for level movement from their level disposition to the receiving station below. The knife blades can be adjusted to project into the openings 68 and 69 only a short distance, so that the cuts left in the food products will be barely perceptible.

Located at loading station 14 proximate openings 68 and 69 is a member 80 having concave portions 81 and 82 formed therein for snug receipt of the stacks arriving at the loading station. The concave portions 81 and 82 are of such a size and so positioned to mate with the periphery of the food product and to compliment the shape of concave portions 37 and 38 of member 31. The mated pairs of concave portions provide for upright alignment of the stacks, that is to say, they serve to trim up the sides of the stacks to correct any slight poker-chipping which may have occurred and to align the stacks more precisely with the openings 68 and 69.

The loading station 14 can also advantageously include a support member, such as the tines or fingers 84 shown in FIG. 1, for support of the plurality of stacks at the loading station over openings 68 and 69. The times 84, extending across a substantial part of the openings 68 and 69, provide much firmer support for the stacks than do the knife blades 70–75. Firmer support is desirable to assist in supporting the weight of the stacks, particularly when the stacks are occasionally held above the openings at loading station 14 while awaiting cycling of the packaging apparatus. The fingers 84 extend through and are supported by block 80, and they are preferably connected to shuttle member 85 to move as a unit. Thus, the support member, composed of fingers 84, is retractable through the block 80 for temporary support of the stacks on the knife blades. The retracted position of shuttle member 85 is shown in phantom in FIG. 1.

The times 84 illustrated in FIG. 1 are mounted for uni-directional retraction, i.e., they withdraw from the openings 68 and 69 by parallel movement in a single direction. It will be appreciated that other types of retractable support members can equally well be employed, such as sets of interdigitating tines or iris-type diaphragms. When the support member is of the type mounted for uni-directional retraction, such as tines 84, a plurality of three knife blades can advantagously be positioned about each of the openings 68 and 69. The first two knife blades, 70 and 71 in the opening 68 and 73 and 74 in the opening 69, are mounted in spaced relation for engagement of a stack as the tines first begin to retract. Thus, the two knife blades 70 and 71 and the pair of blades 73 and 74 are mounted about the openings 68 and 69, respectively, near the distal ends of the tines 84. As the tines retract the pairs of knife blades 70, 71, and 73, 74 will engage the underside of the stacks for stable and level support thereof. Within each opening, then, only a single knife blade 72 or 75 is needed opposite the pairs 70, 71 or 73, 74 to maintain temporary support of the stacks when the support member 84 is fully retracted. After retraction of fingers 84, plungers 77 and 78 drive the product downwardly past the knives to the package positioned below in the receiving station.

The movement of the various movable members of the apparatus is preferably powered by a system of air cylinders, composed of three pairs of cylinders. The cylinders 86 and 87 drive product-engaging member 31. Each is mounted to the housing of the apparatus and the piston rods 86′ and 87′ of air cylinders 86 and 87, respectively, are secured to protruding tabs 88 and 89 on backing plate 90 of product-engaging member 31. To prevent binding, the air cylinders 86 and 87 are mounted parallel to and at the height of the guide shafts 32 and 33, as is best seen in FIG. 2. All of the air cylinders herein employed are of the type which allow air to be injected on either side of a piston to drive the piston rod in either direction.

Driven by the air cylinders, product-engaging member 31 will tend to move quite rapidly and abruptly. To prevent excessive wear of the moving parts and to provide for precise and abrupt termination of its travel, member 31 is cushioned by shock absorbers 91 and 92 upon its arrival at loading station 14 and by shock absorbers 93 and 94 upon its return to transfer station 13. The placement of the shock absorbers, omitted from FIG. 1 can be seen in FIGS. 2 and 3. They are preferably placed above the level of the guide shafts 32 and 33. Product-engaging member 31 carries shock-engaging tabs 95 and 96 projecting from its sides, which are positioned to engaged the plungers 93′ and 94′ of shocks 93 and 94 when member 31 is in its position proximate transfer station 13 and also to engage plungers 91′ and 92′ of shocks 91 and 92 when member 31 is in its position at loading station 14.

The fingers 84 and supporting shuttle member 85 are similarly driven by air cylinders 97 and 98, which are mounted parallel to and beneath air cylinders 86 and 87. In FIG. 1 the upper air cylinder 86 has been partially removed to expose air cylinder 98 beneath it. The piston rods 97′ and 98′ of these air cylinders are secured to shuttle member 85. Shock absorbers 99–102 are mounted to absorb the shock of shuttle member 85 and tines 84 as they reciprocate between their support and retracted positions.

Plungers 77 and 78 are driven by air cylinders 104 and 105, which are mounted vertically above openings 68 and 69 with their piston rods, e.g., 104′, secured to product-engaging plungers 77 and 78.

The activation of air cylinders 86, 87, 97, 98, 104, and 105 in proper sequence is preferably controlled by an air logic control system (not shown), well understood by those skilled in the art, although other drive and control systems could be used besides air cylinders and air logics without departing from the present invention.

It should be pointed out that any surfaces which will contact food in the course of operation should be made either of stainless steel or of a material approved by the U.S. Department of Agriculture, such as ultra-high molecular weight polyethylene materials. In the illustrated embodiment members 31 and 80, loading station 14 generally, and stop means 41 are constructed of ultra-high molecular weight polyethylene, while plungers 77 and 78 and the tines 84 and knife blades 70–75 are constructed of stainless steel. The entire apparatus is enclosed within housing 106, which besides providing structural support also serves to protect the food products and food-containing surfaces from dust and other contamination. For the same reason, motor 27 mounted within the housing 106 is enclosed in its own housing 107 to prevent contamination of the food by motor oil or lubricant. It is preferable that the apparatus be covered by a transparent top 108. In this way the food is protected from contamination yet the operation of the apparatus can still be visually inspected.

The apparatus illustrated in the figures includes a holding station 12 within housing 106, which can be reached only through an opening in the housing wall at the entrance to the holding station. This arrangement is to be preferred for safety reasons, as it prevents accidental injury which is bound to result if human limbs or other objects could be thrust into the apparatus. To prevent stacks from wandering off the conveyor at the holding station, particularly when a backlog of stacks accumulates, holding station 12 is lined with guide rails 109 within housing 106. These guide rails are supported by standoffs 110. Although the apparatus illustrated in the figures includes holding station 12 as an integral part thereof, this is not necessary for the operation of the present invention. The holding station may equally well be provided at the output of other apparatus, such as slicing, stacking, or weighing apparatus. The holding station could also be supplied by a separate feed conveyor, distinct from the conveyor of the present apparatus, for connecting the present apparatus with a source of stacks.

In operation, the apparatus of the present invention cycles as follows. A stack, such as 11, is carried at a rapid rate by the conveyor to transfer station 13 until it impinges upon the leading edge 42 of stop means 41. Because slicing and stacking machines generally have an erratic output, holding station 12 will sometimes be empty and sometimes will accumulate a backlog. Due to the variable-displacement nature of the accumulating conveyor, the first stack abutting against stop means 41 can remain in that position until a full complement of stacks arrives at transfer station 13. When the predetermined number (in the apparatus of the drawing 2) of stacks is in a position slightly upstream of concave portions 37 and 38, the whisker switches 43 and 44 will be tripped. This activates the transverse movement of member 31, which in turn causes stop means 41 to be displaced, thereby freeing the first stack and all those behind it at transfer station 13 for continued longitudinal movement along the conveyor as member 31 begins its transverse motion. The first stack is thus carried into a position in approximate, if not precise registration with concave portion 37, so that member 31 can pick up or catch the first stack in the pocket formed by 37 (see stack 56 in FIG. 3). Simultaneously, wedge-like portion 52 functions to separate the stacks behind the first stack and guide them into their respective concave portions. Wedge-like portion 52 is shaped to achieve this purpose either by wedging in between adjacent stacks or by intercepting trailing stacks as they are carried along by the conveyor.

Upon arrival at loading station 14, the plurality of stacks carried by member 31 is brought to an abrupt stop in precise registration over the openings 68 and 69 where the stacks are supported by the support tines 84. The cooperation between the concave portions of member 31 and member 80 serves to sharpen the alignment and registration of the stacks over the openings. The operation of the present invention will normally be coordinated with the operation of a packaging machine below openings 68 and 69. When a package is moved into position beneath loading station 14 by the packaging apparatus, air cylinders 97 and 98 are activated to retract the support tines 84, thereby leaving the stacks to rest on the knife blades 70–75. Immediately thereupon, air cylinders 104 and 105 are activated to forcefully urge the stacks past the knife blades and into the packages or receptacles waiting below. The plungers 77 and 78 are then quickly raised, and tines 84 are advanced as member 31 is returned to its initial position proximate transfer station 13, whereupon all obstacles blocking passage from holding station 12 are removed, and the cycle begins again. If operation of the present apparatus is halted for any reason while shuttle member 31 is at the loading station, stop means 64 will block the passage of stacks to transfer station 13.

What is claimed is:

1. Apparatus for supporting a knife-edge penetratable product at a loading station and transferring said product to a receiving station, said apparatus including loading station and support means formed for support of said product thereon at said loading station and formed to permit transfer of said product to receiving station, and means formed to engage said product and formed for transfer of said product from said loading station to said receiving station, wherein the improvement in said apparatus comprises:

said support means includes a plurality of knife blade supports in a single horizontal plane having sharpened edges mounted at said loading station to define a central opening therebetween dimensioned for engagment and temporary support of said product on said edges proximate the perimeter of a side of said product, said support means further includes a movable support member mounted to support said product centrally of said knife blade supports at said loading station, means for retracting said movable support member to deposit said product on said knife blade supports, and said means formed to engage said product is formed to push said product past said knife blade supports and to cause penetration of only the perimeter of said product by said edges during transfer of said product from said loading station to said receiving station whereby said product is still substantially intact upon reaching said receiving station.

2. Apparatus for supporting a knife-edge penetratable product at a loading station for transfer by plunger means of the product to a receiving station including, a plurality of knife blades in a single horizontal plane having sharpened edges positioned for engagement and temporary support of said product on said edges proximate the perimeter of said product, and a movable support member mounted to support said product at said loading station and formed for retraction from said loading station to deposit said product on said edges, wherein the improvement in said apparatus is comprised of:

means for uni-directional retraction of said movable support member, and said plurality of knife blades consists of three knife blades, a first two of which are mounted in spaced relation for engagement of said product at its perimeter as said movable support member begins to retract and the third of which is mounted for engagement of said product at its perimeter opposite said first two when said movable support member is fully retracted.

* * * * *